April 29, 1958 O. E. WAGENKNECHT 2,832,600

CENTER-DROP PHONOGRAPH SPINDLE

Filed July 21, 1954 2 Sheets-Sheet 1

OTTO E. WAGENKNECHT
*INVENTOR.*

BY *Francis W. Crotty*

HIS ATTORNEY.

April 29, 1958 O. E. WAGENKNECHT 2,832,600

CENTER-DROP PHONOGRAPH SPINDLE

Filed July 21, 1954 2 Sheets-Sheet 2

OTTO E. WAGENKNECHT
*INVENTOR.*

BY Francis W. Crotty

HIS ATTORNEY.

United States Patent Office 2,832,600

Patented Apr. 29, 1958

2,832,600

CENTER-DROP PHONOGRAPH SPINDLE

Otto E. Wagenknecht, Chicago, Ill., assignor to Zenith Radio Corporation, a corporation of Illinois Application July 21, 1954, Serial No. 444,849

2 Claims. (Cl. 274—10)

This invention relates to a phonograph having a turntable and a record storing and ejecting mechanism for supporting a stack of records and more particularly to a phonograph in which the record storing and ejecting mechanism is incorporated into a spindle of the center-drop type. As used throughout the specification, the term "center-drop" spindle refers to an arrangement wherein a record ejecting mechanism is contained within a central spindle of an automatic phonograph.

Automatic record players, wherein the records are supported in stacked relation above the turntable and dropped one at a time onto the playing surface, are well known and have obtained a considerable degree of popularity. These players are primarily of two types; one where the records are peripherally supported by one or more posts positioned at the side of the turntable and are dropped by a pusher which discharges the records singly from the side posts onto the turntable and the other where they are supported by an offset portion of a center-drop spindle which engages the records of the stack at their center or spindle aperture. This invention has to do particularly with the latter type of record player.

In players of the type under consideration, featuring a spindle with a self-contained ejector, the spindle structure has a hollow lower section extending through the turntable and an upper section that is integral with but offset with respect to the lower section to provide a small step on which the stack of records rests. Within the lower section is rotatably supported a shaft which is connected to the record changing drive mechanism and carries an ejector finger extending through and slightly beyond a cut-away in the spindle offset to enter into the centering aperture of the lowermost record of the stack. Rotation of the shaft causes the ejector finger to slide the bottom record over the offset so that it drops onto the turntable. When the ejector is returned to its initial position the record changing function may be repeated.

While the described structure has proved to be satisfactory and is currently in commercial use, it is subject to certain limitations. For example, there is no provision for preventing inadvertent horizontal displacement or movement of the lowermost record during the playing cycle. As a consequence, it is possible for the ultimate record of the stack to be knocked off the spindle by a slight jar prior to the time when the record-change mechanism operates the ejector shaft. Moreover, there is often no provision for preventing horizontal movement of the penultimate record while the ultimate record is being ejected from the stack. As a result, the force of friction which the lowermost record exerts upon the penultimate record may sometimes cause both records undesirably to drop onto the turntable.

It is an object of this invention, therefore, to provide an improved center-drop spindle for a phonograph which overcomes one or more of the aforementioned objections of the described prior arrangements.

It is a further object of this invention to provide a center-drop spindle which prevents the lowermost record from being dropped to the turntable prematurely or inadvertently.

It is an additional object of this invention to provide a center-drop spindle which prevents horizontal movement of the ultimate record prior to the initiation of the record-changing cycle and also prevents horizontal movement of the penultimate record during the record-changing cycle.

In accordance with the invention, the record storing and ejecting mechanism for supporting a stack of records above the turntable of a phonograph comprises a center-drop spindle having a generally cylindrical hollow lower section disposed perpendicular with respect to the turntable and partially capped on its upper extremity to form a shoulder. The spindle further comprises a generally cylindrical upper section affixed in angular but offset relation to the lower section although it is continuous with the lower section. A hollow generally cylindrical cap is slidably supported upon the upper section and depends into the spindle receiving aperture of the lowermost record of the stack to restrain the record from horizontal movement. A push-up pin is positioned within the lower section and movable vertically to engage and displace the cap from the aperture of the lowermost record. A shaft is also positioned within the lower section having a record ejector pin projecting therefrom into the uncapped portion of the upper extremity of the lower section and movable from an initial position free of the lowermost record to an ejecting position in which the pin is received in the aperture of the lowermost record. A record-change mechanism is provided for displacing the push-up pin into engagement with the cap and for displacing the ejector pin into the ejecting position at the start of a record-change cycle and further for actuating the ejector pin to displace the lowermost record off the shoulder.

The features of the present invention which are believed to be novel are set forth with particularity in the appended claims. The invention, together with further objects and advantages thereof, may best be understood, however, by reference to the following description taken in connection with the accompanying drawing, in the several figures of which like reference numerals indicate like elements and in which:

Figure 1:
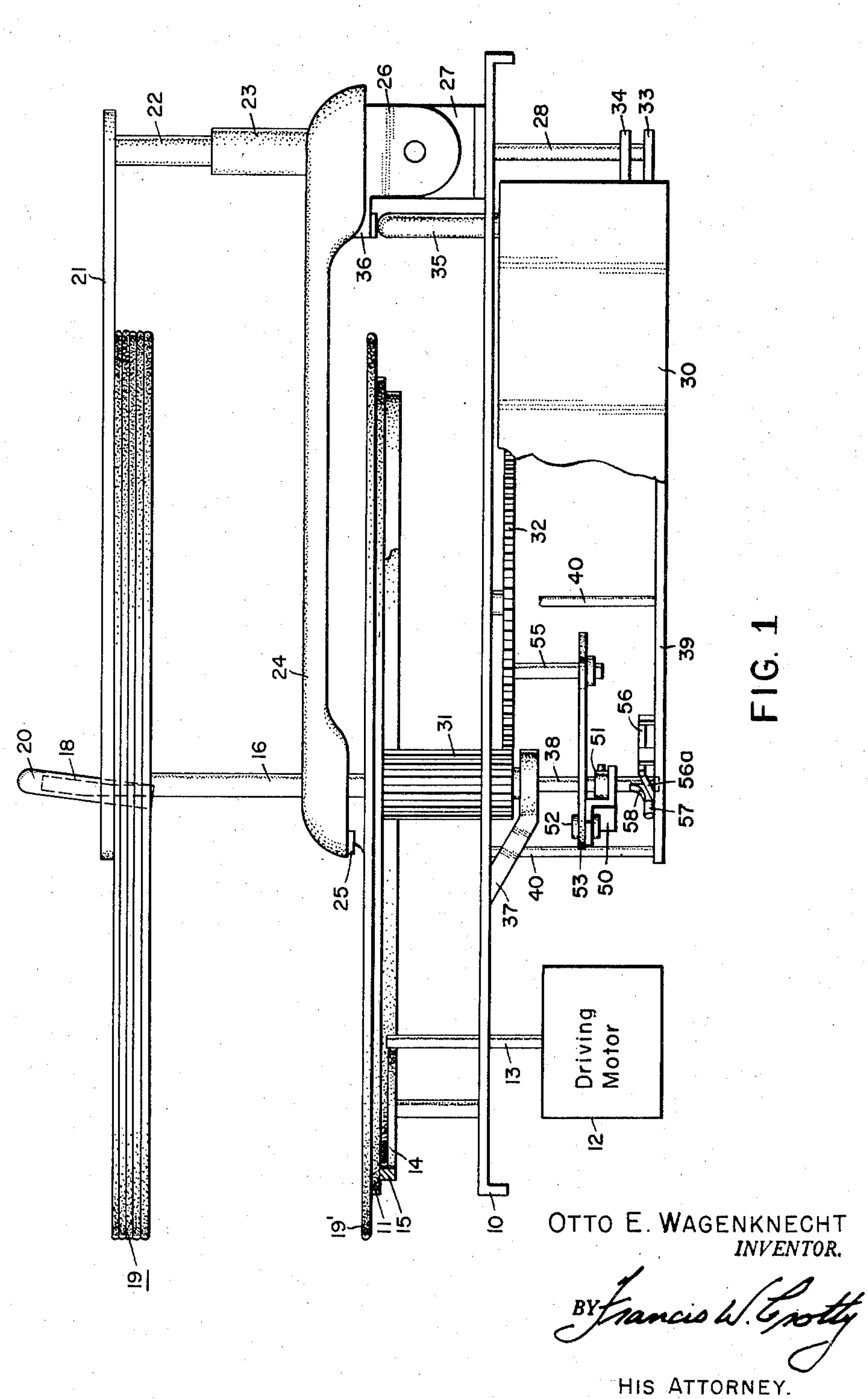
Figure 1 is a functional representation, partly in block form, of a phonograph including a record storing and ejecting mechanism embodying the present invention.

The record player illustrated in Figure 1 includes a mounting base 10 on which a turntable 11 is supported for rotation. A driving motor 12 has a drive shaft 13 and is coupled to turntable 11 by an idler gear 14 which is in frictional driving engagement with a flange 15 depending from the turntable. Although a particular mechanical coupling system has been illustrated, it is to be understood that other forms of coupling between motor 12 and turntable 11 may be employed. For example, while motor 12 is oftentimes of the synchronous variety, it is desirable that a speed adjustment be available. This may, of course, be accomplished by completing the driving connection to the turntable through a further idler gear, sandwiched between the upper surface of idler 14 and the underneath surface of the turntable and movable radially with respect to idler 14 in the manner described and claimed in Patent 2,674,132 issued on April 6, 1954, in the name of Maurice E. Hardy and assigned to the same assignee as the present invention. The particulars of the driving system constitute no part of this invention and the preferred Hardy drive has not been shown merely to simplify the drawing.

Figure 3:
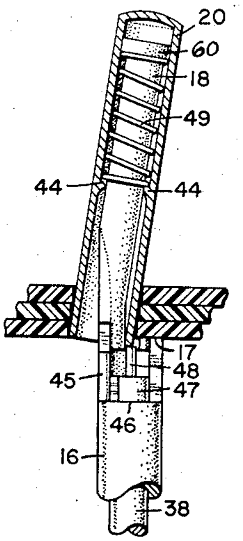
Figures 3, 4 and 5 individually comprise a side elevational view, partly in cross-section, of a portion of the spindle mechanism of the phonograph, showing operating positions thereof during various phases of a record-changing cycle.

A center-drop spindle having a generally cylindrical hollow lower section 16 is disposed perpendicular to turntable 11 and section 16 is partially capped on its upper extremity to form a shoulder 17, shown in Figure 3. The spindle further includes a generally cylindrical upper section 18 which is affixed in angular but offset relation to lower section 16 and is continuous with that section. A plurality of record discs may be stored in a stack 19 along upper section 18 with the lowermost record resting upon shoulder 17. The spindle further includes a generally cylindrical cap 20 slidably supported upon upper section 18 and depending into the spindle receiving apertures of all the records of stack 19 normally to restrain the records from horizontal movement. This normal position of cap 20, extending into the spindle apertures of the stack, is clearly illustrated in Figure 3. Cap 20 is provided with a pair of detents 44 serving as a stop abutment for a spring 49 which is threaded over upper spindle section 18 between stops 44 and a further stop 60 at the top of the spindle. The record ejecting mechanism which is associated with spindle 16, 17, 18 and 20 will be described hereinafter.

A recording stack leveling arm 21 of conventional design bears upon the uppermost record of stack 19 to maintain the stack in position on shoulder 17 with the records parallel to turntable 11. Arm 21 extends to the vicinity of spindle 16 from a rod 22 which is slidably and rotatably supported within a tubular member 23 affixed to base 10 at a distance from the spindle greater than one-half the diameter of the largest record to be played. With this arrangement, arm 21 is biased downwardly by its own weight but may be lifted clear, then rotated in a direction away from the spindle to a position such that records may be freely loaded on shelf 17 or removed from turntable 11.

A tone arm 24 having a conventional stylus and transducer element 25 affixed to one end is supported for pivotal movement about a horizontal axis by means of a hinge having companion upper and lower portions 26 and 27, upper hinge portion 26 being affixed to the other end of tone arm 24. Tone arm 24 is further supported for rotation about a vertical axis by means of a shaft 28 affixed at one end to hinge portion 27 which rests upon a bearing block secured to base 10. Hence, tone arm 24 is supported in a manner whereby the stylus of element 25 may engage and track the grooves of record 19′ on turntable 11 and yet the tone arm is free to be moved, as required, for record loading, feeding and unloading.

A record-changing mechanism 30 is mechanically coupled to turntable 11 to be driven therefrom by means of a pinion 31 which rotates with the turntable and is selectively in meshing engagement with the usual one cycle mutilated gear 32 of the record-changing mechanism. This mechanism, which may be of any well known construction, includes means for converting the rotary motion of turntable 11 into the various translational movements necessary to perform a record-changing cycle. It is coupled to shaft 28, for example, by the usual cam arm 33 and a trip lever 34 and at the same time is coupled with the lower extremity of a tone arm pusher rod 35 supported for vertical movement in the vicinity of tone arm 24 to permit the free end thereof to engage a projection 36 depending from hinge portion 26.

The lowest section 16 of the spindle extends downwardly through axial openings (not shown) in turntable 11 and pinion 31 and is received within a bracket 37 suspended from base plate 10. The bracket holds the spindle against rotation. Within the spindle there is accommodated a shaft 38 which is oscillated during each record-change cycle, in a manner to be described, to effect ejection of a record from stack 19. The lowermost end of this shaft is received in a suitable bearing or bushing (not shown) secured to a base plate 39 of the record-change mechanism which, in turn, is suspended from the phonograph base 10 by means of posts 40, 40. As clearly shown in Figures 3 and 4, a record ejector pin 45 projects into the uncapped portion of the lower spindle section 16 and is movable from an initial position in which it is free of the lowermost record of stack 19 to an ejecting position in which this pin is received in the spindle aperture of the lowermost record. Pin 45 is a cylindrical rod the diameter of which is only a very minor fraction of the diameter of ejector shaft 38. A portion 46 of the side wall of spindle section 16 is cut away to accommodate ejector pin 45 which, if desired, may be carried by a collar 47 press fitted or otherwise attached to the free upper end of shaft 38.

It is necessary to release cap 20 from the spindle receiving aperture of the lowermost record of the stack before that record can be fed onto the turntable and for that reason a push-up pin 48 is likewise positioned within lower spindle section 16 to be movable vertically into engagement with the lower end of the cap in order to displace that cap with respect to the lowermost record. This pin has a cross-section which is small with respect to the record spindle aperture and may be conveniently arranged mechanically as an upward projection from the central portion of ejector shaft 38. Usually pin 48 extends beyond ejector pin 45 by an amount which is approximately equal to the thickness of a record disc. The push-up pin is in vertical alignment with a peripheral portion of cap 20 to engage the cap when ejector shaft 38 is elevated in the initial phase of a record-change cycle as will be explained presently.

Figure 2:
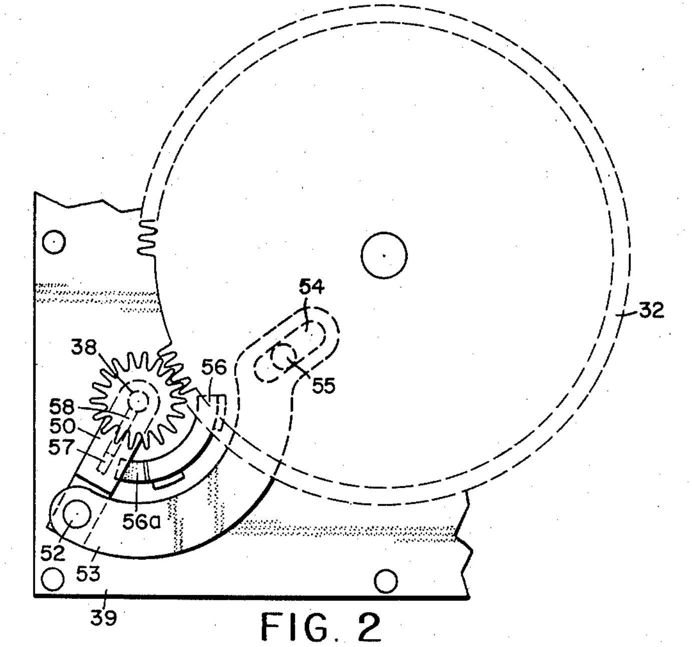
Figure 2 is a plan view showing a portion of the ejector drive mechanism of the phonograph.

It is convenient to include in the record-change mechanism means for concurrently displacing the ejector and the push-up pins into their operative positions at the start of a record-change cycle and such means have been illustrated in Figures 1 and 2. An arm or lever 50 having a companion bushing 51 is slipped over shaft 38 and mechanically secured thereto by a machine set screw so that these parts rotate together. The free end of arm 50 carries a pivot pin 52 which projects through an aperture in a crank arm 53. The opposite end of the crank arm is slotted as indicated at 54 and receives a drive pin 55 depending from the underneath surface of mutilated gear 32. The slot 54 introduces lost motion in respect of the movement of crank arm 53 in the record-change cycle so that the tone arm may be elevated and moved out of position before record ejection takes place.

In addition to the oscillation of shaft 38 provided by crank 53, it may be elevated to advance pins 45 and 48 as required in the record-changing cycle by means of an arcuate cam section 56 supported from plate 39 and a cam-following roller 57 carried on the free end of an arm 58 at the lower portion of shaft 38. The initial movement of shaft 38 is counterclockwise as viewed in Figure 2 so that the portion 56*a* of the cam may be considered to be the leading cam portion. It is hinged to the remainder of the cam track to facilitate restoring shaft 38 to the position represented in Figure 2 at the end of a record-change cycle.

In describing a record-change cycle, it will be assumed initially that tone arm 24 is tracking a record and the ejector mechanism is in its quiescent condition shown in Figure 3. Spindle cap 20 which envelops substantially all of the upper spindle section 18 projects into the spindle receiving apertures of all the records of the stack, including the lowermost one, and cam follower 57 rests on base plate 39 with ejector pin 45 and push-up pin 48 of shaft 38 free and clear of cap 20 as well as the record stack. When stylus 25 reaches the eccentric portion of the record groove, reverse movement of the tone arm 24 displaces arm 34 and actuates a trip mechanism (not shown) included within the record-changing portion 30. Any well known form of trip mechanism may be employed including those responsive to velocity change or position of the tone arm. Whatever the type, the trip mechanism is utilized to actuate a clutch of the record-changing mechanism to complete a drive connection from gear 31 to its various components. More particularly, the trip mechanism when actuated causes pinion 31 to drive the mutilated single cycle gear 32 which causes rod 35 to be displaced upwardly into engagement with projection 36 to pivot tone arm 24 about the horizontal axis of hinge 26, 27 and the stylus is thus carried from engagement with the groove of record 19'. Immediately thereafter movement is imparted to cam arm 33 to rotate shaft 28 and carry tone arm 24 outwardly from the center of record 19', beyond the outer periphery thereof into a position in which a record may be fed from the stack without interference.

While gear 32 is driven throughout this interval, slot 54 in crank arm 53 permits of lost motion so that the crank starts shaft 38 on its counterclockwise travel only when pin 55 has engaged the end of slot 54 closest to the center of gear 32. As the gear continues its drive, crank arm 53 rotates ejector shaft 38 through the linkage afforded by pivot pin 52 and lever 50. Cam follower 57 is driven up the leading inclined section **56*a* of cam track 56 and, in this manner, the ejector shaft is elevated. As a consequence, push-up pin 48 engages spindle cap 20, displacing it from the spindle aperture of the ultimate record of the stack. In particular, the spindle cap is positioned clear of the final record into the position represented in Figure 4 in which it restrains horizontal movement of all but the final record of the stack. At the same time ejector pin 45 which is raised with shaft 38** enters the spindle aperture of the bottom record preparatory to ejecting it.

Figure 4:
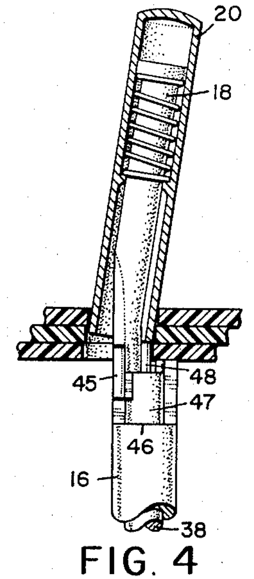
Figure 5:
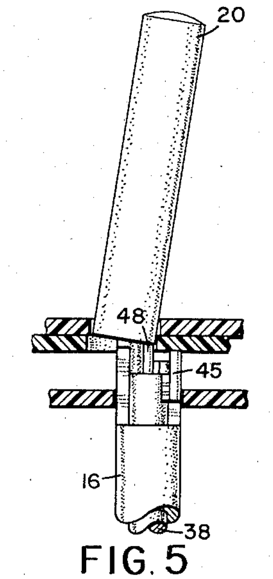

Continued rotation of shaft 38 through the driving link including gear 32 and crank arm 53 courses pin 45 from the position represented in Figure 4 to that of Figure 5 and during this displacement the pin contacts the side of the spindle receiving aperture of the final record of the stack and displaces it off shoulder 17. The record then descends of its own weight onto turntable 11 into playing position and the remaining records of the stack now bear upon the uppermost tip of the ejector pin. Just after the record has thus been ejected, crank 53 achieves its greatest displacement and cam follower 57 is driven beyond cam track 56. Obviously, as soon as the cam follower passes off the track, shaft 38 is permitted to drop but its downward movement is arrested as the cam follower comes to rest on surface 39. At this point in the cycle, the remaining records of the stack are again supported on shoulder 17. Pin 55 having now passed the 180° displacement point drives crank arm 33 in the reverse or clockwise direction. In this travel, cam follower 57 rides on the surface of plate 39 underneath cam track 56 and passes beyond hingled cam section **56*a* until it is returned to its quiescent position shown in Figure 2. Concurrently, push-up pin 48 and ejector pin 45 have been restored to their normal positions shown in Figure 3 and spindle cap 20 is permitted to be urged by spring 49 into the spindle receiving apertures of those records which remain in stack 19. At the close of the record-change cycle, tone arm 24 is returned by appropriate displacement of shaft 28 to its initial tracking position and is lowered onto the record that has been fed onto the turntable. The cycle is thus completed and the sequence may again be carried out as stylus 25** tracks the new record.

The described center drop spindle arrangement provides a record storing and ejecting mechanism which is rugged in construction and easily manufactured. The spindle cap obviates premature or inadvertent horizontal movements of any records of the stack at any time other than the appropriate point in a record-change cycle and protects the apparatus from damage which may otherwise result if records are jarred or otherwise inadvertently displaced from the spindle shoulder 17. The cap further constitutes a positive restraint to all records other than the last one of the stack during the record-change cycle to assure the ejection of but a single record at a time.

While a particular embodiment of the invention has been shown and described, modifications may be made and it is intended in the appended claims to cover all such modifications as may fall within the true spirit and scope of the invention.

I claim:

1. In a phonograph having a turntable, a record storing and ejecting mechanism for supporting a stack of records comprising: a center-drop spindle having a generally cylindrical hollow lower section disposed perpendicularly with respect to said turntable and partially capped on its upper extremity to form a shoulder and further having a generally cylindrical upper section affixed in angular and offset relation to said lower section but being continuous with said lower section; a hollow generally cylindrical cap slidably supported upon said upper section and depending into the spindle-receiving aperture of the lowermost record of said stack to restrain said record from horizontal movement; a push-up pin positioned within said lower section and movable vertically to engage and displace said cap from said aperture of said lowermost record; a shaft also positioned within said lower section having a record-ejector pin projecting into the uncapped portion of said upper extremity of said lower section, said shaft being movable from an initial position in which said record-ejector pin is free of said lowermost record to an ejecting position in which said record-ejector pin is received in said aperture of said lowermost record, said record-ejector pin being movable to eject said lowermost record from said shoulder; and a record-change mechanism for vertically moving said push-up pin to engage and displace said cap from said aperture of said lowermost record and for displacing said ejector pin into said ejecting position at the start of a record-change cycle and further for moving said record ejector pin to displace said lowermost record off said shoulder.

2. In a phonograph having a turntable, a record storing and ejecting mechanism for supporting a stack of records comprising: a center-drop spindle having a generally cylindrical hollow lower section disposed perpendicularly with respect to said turntable and partially capped on its upper extremity to form a shoulder and further having a generally cylindrical upper section affixed in angular and offset relation to said lower section but being continuous with said lower section; a hollow generally cylindrical cap slidably supported upon and enveloping substantially all of said upper section and depending into the spindle-receiving apertures of all of the records of said stack to restrain said records from horizontal movement; a shaft rotatably and slidably supported within said lower spindle section; a push-up pin, having a cross section small with respect to that of said record aperture, projecting upwardly from the central portion of the upper extremity of said shaft; a record-ejector pin projecting upwardly from an upper peripheral portion of said shaft into the uncapped portion of said upper extremity of said lower spindle section but normally resting below the lowermost record of said stack; and a record-change mechanism for raising said shaft at the start of a record-change cycle to cause said push-pin to displace said cap from said aperture of said lowermost record and to place said ejector pin within said aperture of said lowermost record and for thereafter rotating said shaft to displace said lowermost record off said shoulder.

References Cited in the file of this patent

UNITED STATES PATENTS 2,652,257 Mullaney ______________ Sept. 15, 1953